UNITED STATES PATENT OFFICE.

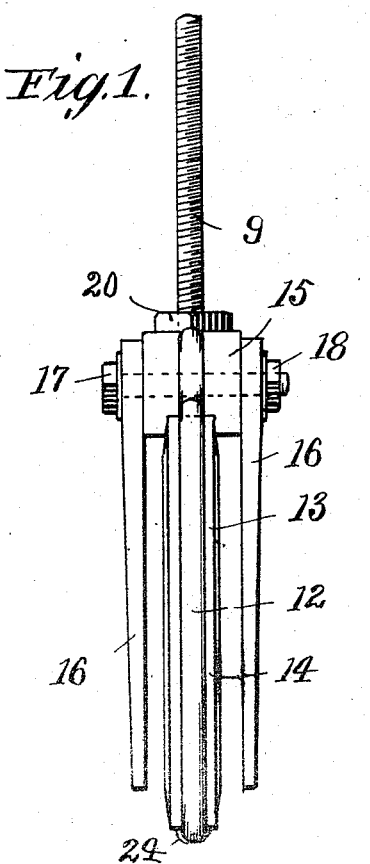
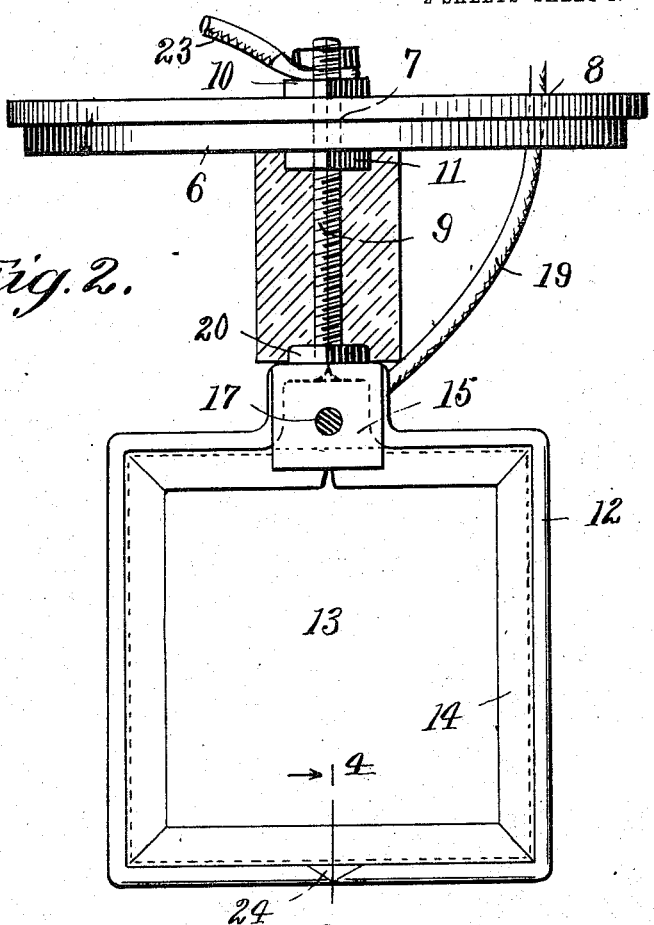
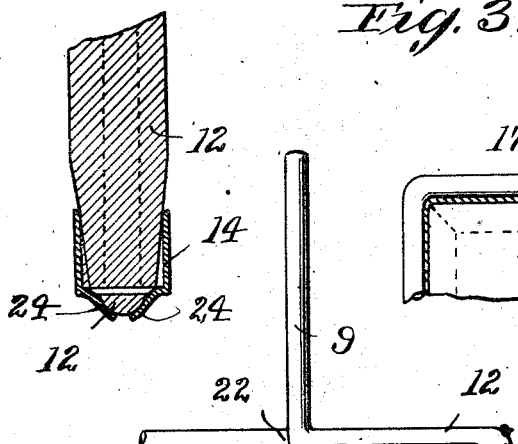
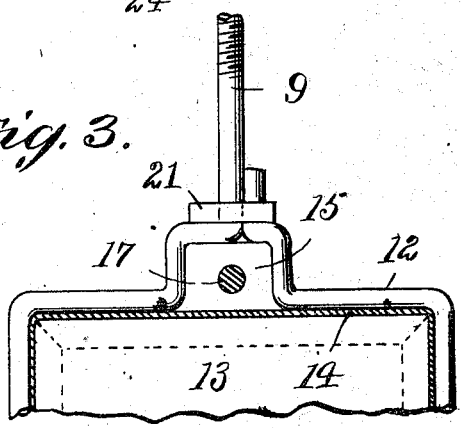

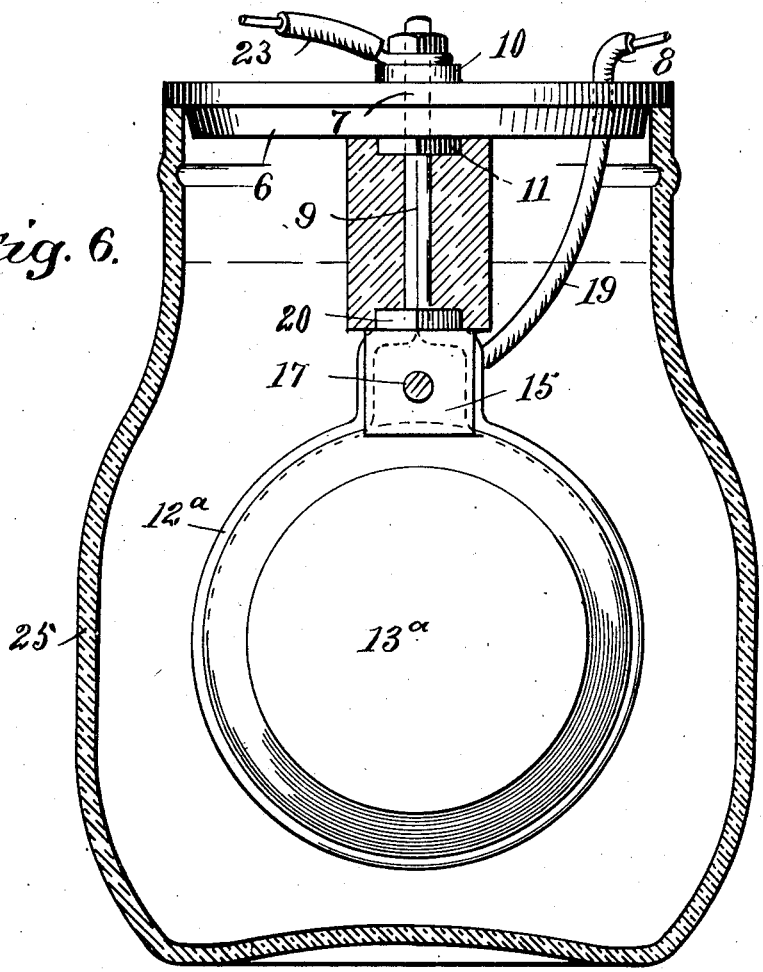
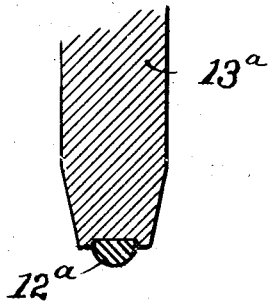

CHARLES B. SCHOENMEHL, OF WATERBURY, CONNECTICUT.

BATTERY-ELEMENT SUPPORT.

1,028,613.  Specification of Letters Patent.  Patented June 4, 1912.

Application filed August 19, 1910. Serial No. 577,922.

*To all whom it may concern:*

Be it known that I, CHARLES B. SCHOEN- MEHL, a citizen of the United States, and resident of Waterbury, in the county of New Haven and State of Connecticut, have invented certain new and useful Improvements in Battery-Element Supports, of which the following is a specification.

My invention relates to improvements in primary electric batteries of the class in which the depolarizer comprises a compressed plate of copper oxid and a positive electrode comprising a somewhat similar shaped zinc plate.

The purpose of my invention is to provide improved means for supporting such electrodes from the cover of a jar by means of a single suspending rod formed integral with the frame; to form such frame largely of wire cut and bent to the proper form in a simple way; to provide means for properly insulating the positive electrodes from the negative electrode and to construct the device in a simple, practical, and inexpensive manner. In the carrying out of my invention I also employ an insulating sleeve arranged intermediate of the said cover and electrode and around the single suspending rod whereby the latter is better protected from the solution of the jar and whereby the electrodes are secured more rigidly to the cover.

With the above objects in view, my invention resides and consists in the novel construction and arrangement of parts shown upon the accompanying sheets of drawings, forming a part of this specification, upon which similar characters of reference denote like or corresponding parts throughout the several figures and upon which—

Figure 1 shows a side edge view of a rectangular form, of my improved supporting frame with correspondingly shaped electrodes secured thereto and ready for attachment to a cover by means of the single suspending rod. Fig. 2 is a side elevation of the frame and assembled elements shown in Fig. 1, except that the near side zinc plate has been removed, and further illustrates the means for and manner of connecting the frame with the battery cover. Fig. 3 shows a modified form of construction, of supporting frame, formed of round wire. Fig. 4 shows an enlarged detailed cross sectional view of frame and negative plate taken on line 4, of Fig. 2. Fig. 5 shows a further modified form of round wire supporting frame, partially broken away. Fig. 6 shows a sectional elevation of a complete battery illustrating my invention as embodied in a circular form of wire frame and electrode, and Fig. 7 is a detail cross section through one edge of frame and circular negative electrode shown in Fig. 6.

Referring in detail to the characters of reference marked upon the drawings 6 represents a common type of porcelain cover for battery jar, having a central hole 7 therethrough and an outer hole 8. The assembled element shown in Figs. 1 and 2 is attached to and suspended from the cover by a central rod 9 that is passed through the central hole 7 and secured in place by the nuts 10 and 11 arranged top and bottom.

The suspending frame proper is formed of one piece of wire 12 bent around to engage the covered edge portions of the negative plate electrode 13 and its integral end or ends are disposed up to form the before mentioned suspending rod 9. The plate electrode 13 may be of either a rectangular or square shape as shown on Sheet 1 or can be of a circular form as shown in Figs. 6 and 7. They are formed in the usual way by first being pressed into shape and then baked. The outer bevel edge portions of these plates are preferably covered by a suitably cut, bent and formed sheet metal binding strip 14 having its two end portions brought together at the top where they are covered by a porcelain block 15 that also serves to insulate the negative from the positive zinc electrodes 16—16. These positive electrodes are secured to the porcelain block by a bolt 17 that passes directly through both of the plates 16, and the said block is provided with a nut 18 by means of which the parts are all clamped together. A wire 19 that is brought down through the outer hole 8. of the cover is attached to the one end of the bolt 17 beneath the nut 18 to form a connection with the positive electrodes.

The wire for the frame may be a half round wire as shown in Figs. 1, 2, 4, 6, and 7, or a complete round as shown in Figs. 3 and 5, or in fact of any other preferred cross sectional shape. It is bent to closely engage and inclose the four metal bound edges of the negative plate as shown, having its end portions disposed upward again and upon the before mentioned insulating block 15 to support the same, and is finally deflected upward again at a right angle to form the suspending rod 9. If the frame be formed of half round wire as shown in Figs. 1, 2, 4, 6 and 7, the two end portions may be laid close together (see Figs. 2 and 6) to form a single hanger rod that is threaded to receive the nut 20 that holds them together, whereas if it be formed of round wire it can be similarly bent, one end cut off and bound to the longer rod end 9 by a suitable ring 21 as shown in Fig. 3.

It is also equally within the scope of my invention to join the parts together as shown in Fig. 5, by disposing the end 22 of the one side against the side of the upwardly disposed rod 9, and secure it thereto by welding, or the end portions as shown in Figs. 2 and 6 may be disposed flat together and also welded. This frame being connected on all four edges with the electrode a good and sufficient contact is made with that side of the battery, while its extended suspending rod also serves for the attachment of a second field wire 23. The ends of the porcelain sleeve are recessed to accommodate the nuts 10 and 11 so that the parts may be brought up flush. The lower cross part of the sheet metal binding strip is stamped out to form two lips 24 that are laid outside of and against the lower cross portion of the wire frame to center and hold the same in place.

In the form shown in Figs. 6 and 7 I have illustrated a circular form of wire frame and circular form of electrode which is somewhat cheaper to manufacture than the square shape and for some purposes is just as practical. These circular forms of electrodes are usually employed in connection with a special shaped battery jar 25 that is largest through its lower portion. The circular frame 12ª shown in these figures is formed of half round wire and the flat sides of the rod end portions are disposed against each other and brazed to hold the circular negative plate 13ª in position. The metal strip 14 may be used as shown in the other forms or the wire 12ª may be laid direct against the edge of the plate and the strip thus dispensed with. A construction of this sort can be inexpensively made and very desirably serves to detachably support the assembled elements by a single rod that can in turn be attached or detached by the operation of the single nut 10. By reason of the cheapness of this form of hanger it can be thrown away when the electrodes become exhausted and a similar frame with new electrodes forming a complete renewal substituted in a very few minutes.

Having thus described my invention what I claim and desire to secure by Letters Patent is—

1. An electrode supporting frame for a battery, comprising a frame formed of a single piece of wire surrounding the edges of the electrode and having its end portions flattened and turned up centrally and the flat sides disposed against each other to form a single round central suspending rod for attachment to a battery cover.

2. An electrode supporting frame for a battery, comprising a frame formed of a single piece of half round wire surrounding the edges of the electrode and having its end portions turned up and the flat sides disposed against each other to form a single round suspending rod for attachment to the central part of a battery cover, and detachable means with a round hole therethrough to engage the round suspending rod and for holding the said end portions together adjacent to the said plate.

3. The combination with a plate electrode, of a sheet metal binding strip covering the edges of the plate, a wire frame surrounding the edges of the binding strip and having its two end portions disposed upwardly from the central part of the electrode to form a suspending rod.

4. An electrode supporting frame for a battery, comprising a frame formed of a single piece of wire bent to surround the edge portions of the said electrode, a sheet metal binding strip intermediate the wire and electrode and having lips struck up therefrom to engage the frame and hold it in place.

5. An electrode supporting frame for a battery, comprising a frame formed of a single piece of wire bent circularly to engage the edges of a circular shaped negative electrode and having its end portions disposed upwardly and centrally from the top portions of the electrode to form a single centrally disposed suspending rod.

Signed at Bridgeport in the county of Fairfield and State of Connecticut this 17th day of August A. D., 1910.

CHARLES B. SCHOENMEHL.

Witnesses:
C. M. NEWMAN,
GEO. R. BURNES.